(12) United States Patent
Bidermann (10) Patent No.: US 6,541,751 B1
(45) Date of Patent: Apr. 1, 2003

(54) TIME MULTIPLEXING IMAGE PROCESSING FUNCTIONS FOR NOISE REDUCTION

(76) Inventor: William R. Bidermann, 15757 Kavin La., Los Gatos, CA (US) 95030

( * ) Notice: Subject to any disclaimer, the term of this patent is extended or adjusted under 35 U.S.C. 154(b) by 0 days.

(21) Appl. No.: 09/970,463

(22) Filed: Oct. 3, 2001

(51) Int. Cl.⁷ ............................................... H01L 27/00
(52) U.S. Cl. ................... 250/208.1; 348/241
(58) Field of Search ......................... 250/208.1, 214 C, 250/214 DC; 348/241, 246, 281, 307, 308

(56) References Cited

U.S. PATENT DOCUMENTS

| | | | | |
|---|---|---|---|---|
| 5,461,425 A | * | 10/1995 | Fowler et al. | 348/294 |
| 5,801,657 A | * | 9/1998 | Fowler et al. | 341/155 |
| 6,127,684 A | * | 10/2000 | Kaifu | 250/370.09 |
| 6,130,423 A | * | 10/2000 | Brehmer et al. | 250/208.1 |
| 6,147,707 A | * | 11/2000 | Terasawa et al. | 348/229.1 |
| 6,380,880 B1 | * | 4/2002 | Bidermann | 341/155 |
| 6,452,152 B1 | * | 9/2002 | Yang | 250/208.1 |
| 2001/0009440 A1 | * | 7/2001 | Yang et al. | 348/294 |
| 2002/0101528 A1 | * | 8/2002 | Lee et al. | 348/304 |

* cited by examiner

Primary Examiner—Stephone Allen
Assistant Examiner—Eric J. Spears
(74) Attorney, Agent, or Firm—Patent Law Group LLP; Carmen C. Cook (57) ABSTRACT

A system on a chip for an image sensor includes a sensor array, a readout circuit, a data memory and a processor. The sensor array includes a two-dimensional array of pixel elements and a plurality of analog-to-digital conversion (ADC) circuits where each ADC circuit is coupled to one or more pixel elements in the sensor array. The readout circuit is coupled for reading the pixel data from the sensor array. The data memory is coupled for the sensor array for storing the pixel data. The processor is coupled for processing the pixel data. In operation, the system on a chip deactivates at least one noise-inducing circuit while a noise-sensitive circuit is activated. In one embodiment, the noise-sensitive circuit is one or more of the ADC circuits, and the noise-inducing circuit is one of the readout circuit, the data memory and the processor.

17 Claims, 5 Drawing Sheets

TIME MULTIPLEXING IMAGE PROCESSING FUNCTIONS FOR NOISE REDUCTION

BACKGROUND OF THE INVENTION

1. Field of the Invention

The invention relates to a system on a chip (SOC) image sensor, and more particularly to a method for reducing noise in an SOC image sensor.

2. Description of the Related Art

An imaging system for capturing an image of a scene and generating signals indicative of the image generally includes an image acquisition component and an image processing component. The image acquisition component typically a photosensitive device, such as a charged-coupled device (CCD) or a Complementary Metal-Oxide Semiconductor (CMOS) device. The photosensitive device reacts to light reflected from the scene and can translate the strength of that reaction into electronic charging signals that are digitized. Because the image is actually a collection of numeric data, the image data can easily be provided to the image processing component, such as a microprocessor, where the image can be manipulated for more artistic effects.

Conventional imaging systems are usually built using separate integrated circuits for the different components constituting the imaging system. Thus, the image acquisition component including the image sensor and the supporting circuitry may be built on one integrated circuit while the image processing component including a signal processing unit may be built on another integrated circuit. As a result of using separate integrated circuits, noise generated in one component does not coupled easily to other components of the imaging system. This is because noise coupling generally occurs through the power supply lines within an integrated circuit or through the substrate on which the integrated circuit is built. As the components are separate, noise generated in one integrated circuit does not couple easily to another integrated circuit.

A system on a chip (SOC) refers to an integrated circuit where the electronics for a complete, working product are contained on a single chip. In other words, an SOC is an integrated circuit where the complete functions of a product are integrated onto a single integrated circuit core. For example, an SOC for an image sensor is an integrated circuit including all the electronics for a complete imaging system. An SOC image sensor may include a sensor array, supporting readout circuitry, analog-to-digital conversion (ADC) circuitry, and image processing circuitry. Mixed signal SOCs are available for applications such as cell phones, modems and analog-to-digital converters.

There are obstacles to overcome before an SOC for an image sensor can be successfully developed. For example, when various functions of an imaging system are integrated onto a single integrated circuit, noise coupling between the different components of the integrated circuit can negatively impact circuit performance, particularly for noise sensitive circuits. For example, the analog-to-digital conversion (ADC) circuit in a digital image sensor is one such noise sensitive component.

In general, there are four basic operations associated with a conventional digital imaging system. First, there is an integration process where photodetectors in an area image sensor are exposed to light, generating analog signals indicative of the light intensity level of a scene being captured. Then, there is a readout process where the analog signals generated by the photodetectors are read out of the image sensor. There is an ADC process where the analog signals are converted into digital signals, also known as pixel data or digital pixel data. Depending on the types of image sensor, the ADC process can occur before or after the readout process. Finally, the pixel data is provided to an image processor for processing.

Figure 1:
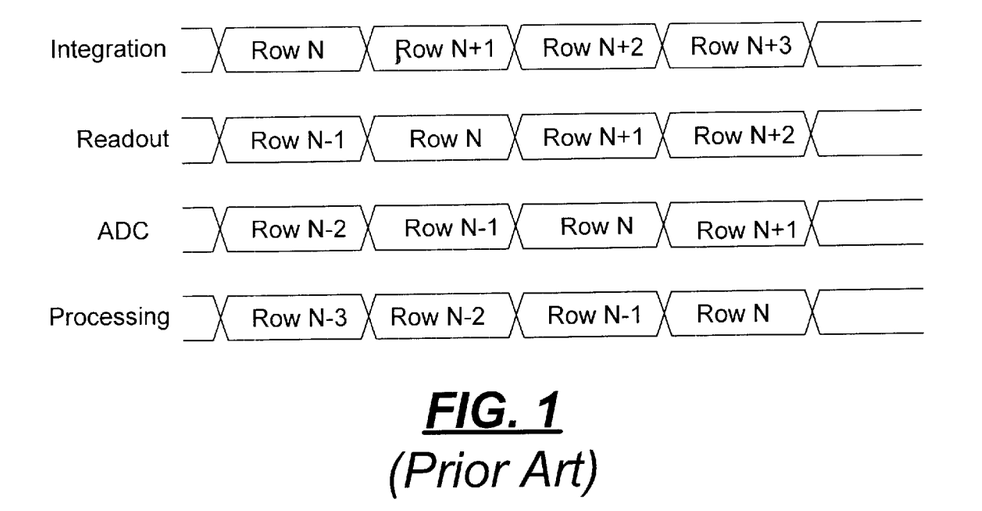
FIG. 1 is a timing diagram illustrating the operations of a conventional digital image sensor.

In a conventional imaging system, such as one employing an active pixel sensor as the image sensor, these basic operations generally occur in a pipeline, scrolling fashion. FIG. 1 is a timing diagram illustrating the operations of a conventional digital image sensor. As shown in FIG. 1, while light integration is being carried out for the pixels in Row N, the readout process is outputting analog data from Row N-1. Also at the same time, the ADC process is converting signals in Row N-2, readout at a previous cycle, to digital pixel data. Finally, also at the same time, the image processor is operating on the digital pixel data on Row N-3, readout and digitized in previous cycles. If the imaging system is made into an SOC, all these operations will occur at the same time on the same piece of semiconductor substrate. Thus, noise generated by the image processing operations can be coupled to circuitry handling the ADC operations. Because the ADC circuit is particularly noise sensitive, such noise coupling can negatively impact the accuracy of the ADC operation. In fact, noise coupling to the ADC circuit can reduce the signal to noise ratio of the ADC circuit and consequently degrade the image quality. Therefore, in order to successfully build an SOC for an image sensor, it is imperative to isolate noise generated by noise-inducing circuits of the SOC from noise sensitive circuitry of the SOC.

Existing techniques to isolate noise in an SOC typically include physical isolation of the different noise sources. For example, the power supply lines for different circuit blocks in an integrated circuit may be physically isolated to decouple the noise generated by the different circuit blocks. Power supply line isolation can start from the silicon substrate and extend to the external package pins to ensure complete decoupling. However, while isolation of power lines may be effective in decoupling circuit noise, power line isolation can induce other circuit weaknesses, such as reducing immunity to electrostatic discharge.

Other techniques for noise isolation involve physically isolating the noise-inducing parts of the circuits. However, these physical isolation techniques often lead to larger die area for implementing the circuits and isolation structures, thus increasing the die size of the integrated circuit and the associated manufacturing cost.

Therefore, it is desirable to provide an improved noise isolation technique, particularly for use in building an SOC for an image sensor.

SUMMARY OF THE INVENTION

According to one embodiment of the present invention, a system on a chip for an image sensor includes a sensor array, a readout circuit, a data memory and a processor. The sensor array includes a two-dimensional array of pixel elements, that outputs digital signals as pixel data representing an image of a scene. The sensor array includes a plurality of analog-to-digital conversion (ADC) circuits where each ADC circuit is coupled to one or more pixel elements in the sensor array. The readout circuit is in communication with the sensor array for reading the pixel data from the sensor array. The data memory is in communication with the sensor array for storing the pixel data. The processor is in communication with the data memory for processing the pixel data. In operation, the system on a chip deactivates at least one noise-inducing circuit while a noise-sensitive circuit is activated.

In one embodiment, the noise-sensitive circuit is one or more of the ADC circuits, and the noise-inducing circuit is one of the readout circuit, the data memory and the processor.

According to another aspect of the present invention, the operations of the noise-sensitive circuit and operations of the noise-inducing circuit are time multiplexed.

The method and apparatus of the present invention is effective in decoupling noise between noise-inducing circuits and noise-sensitive circuits on a system on a chip for an image sensor. By time multiplexing the noisy functions with the noise-sensitive function, circuit noise generated by noise-inducing circuits can be isolated from the noise-sensitive circuits, thereby improving the performance of the system on a chip.

The present invention is better understood upon consideration of the detailed description below and the accompanying drawings.

BRIEF DESCRIPTION OF THE DRAWINGS

In the present disclosure, like objects which appear in more than one figure are provided with like reference numerals.

DETAILED DESCRIPTION OF THE PREFERRED EMBODIMENTS

In accordance with the present invention, a method for decoupling noise in a system on a chip (SOC) for an image sensor includes time multiplexing noise-inducing functions and noise-sensitive functions of the SOC. The time multiplexing technique operates to isolate circuit noise in a temporal fashion and therefore, does not require additional silicon area or special layout techniques to implement. The method of the present invention is effective in isolating circuit noise between functional blocks in an SOC for an image sensor for improving the image quality without the disadvantages of using physical isolation structures which increase the size and the cost of the SOC integrated circuit.

The generation of noise or circuit noise in an integrated circuit, and the impact thereof are well known to those skilled in the art of integrated circuit design. The terms "noise" or "circuit noise" used in the present description have their ordinary meaning in the art and refers to the extraneous signal that invades an electrical transmission on a signal line. Circuit noise can come from strong electrical or magnetic signals in nearby signals lines and from power line spikes.

Figure 2:
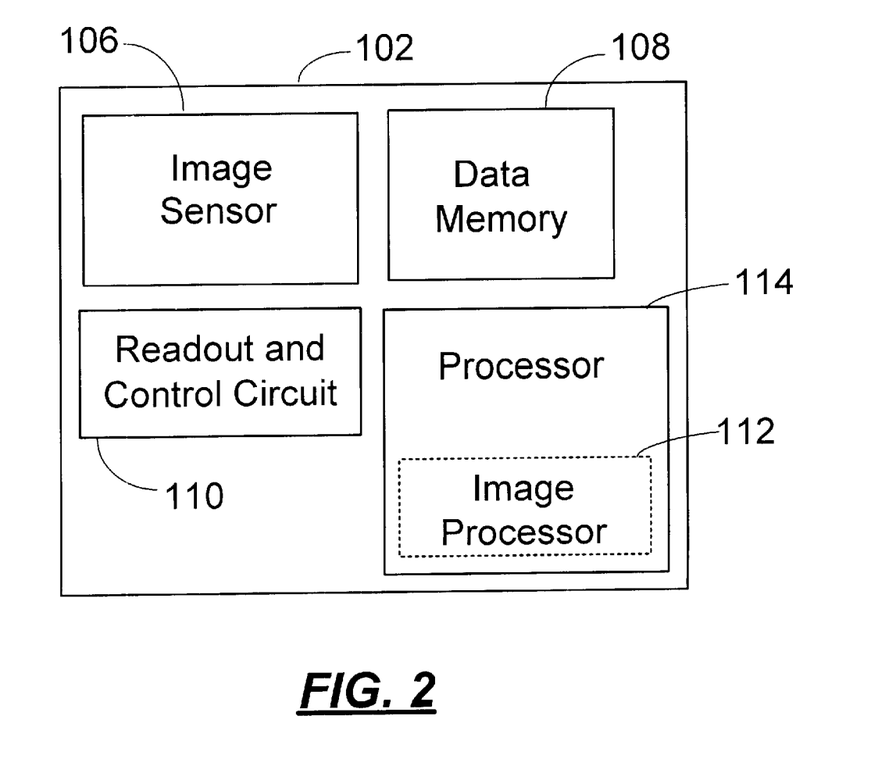
FIG. 2 is a block diagram of an SOC image sensor in which the method of the present invention can be practiced.

The method of the present invention has particular application in an SOC for an image sensor where the electronics for implementing a complete, working imaging system are contained on a single integrated circuit. FIG. 2 is a block diagram of an SOC image sensor in which the method of the present invention can be practiced. Of course, FIG. 2 is illustrative only and the method of the present invention can be used with other architectures for an SOC image sensor as well.

Referring to FIG. 2, an SOC image sensor 102 includes an image sensor 106, a data memory 108, a readout and control circuit 110, a processor 114. In the present embodiment, processor 114 includes a functional block, denoted image processor 112, for performing image processing functions. However, image processor 112 is not necessarily a separate processor apart from processor 114. In actual implementation, image processor 112 may be configured as a separate processing unit, such as a digital signal processing chip, or the image processing functions performed by image processor 112 may be part of the functions performed by processor 114. Image sensor 106 is an area image sensor and can be implemented as a Complementary Metal-Oxide Semiconductor (CMOS) image sensor. Of course, image sensor 106 can be implemented using any image sensor, presently available or to be developed. Image sensor 106 includes a two-dimensional array of light detecting elements, also called photodetectors. In FIG. 2, image sensor 106 is arranged as N rows by M columns of photodetectors and has an image resolution of N×M pixels. For example, image sensor 106 can have an image resolution of 100×100 pixels. For color applications, a mosaic of selectively transmissive filters is superimposed in registration with each of the photodetectors so that multiple groups of photodetectors are made to sense different color ranges, for example, the red, green and blue ranges of the visible spectrum.

Figure 3:
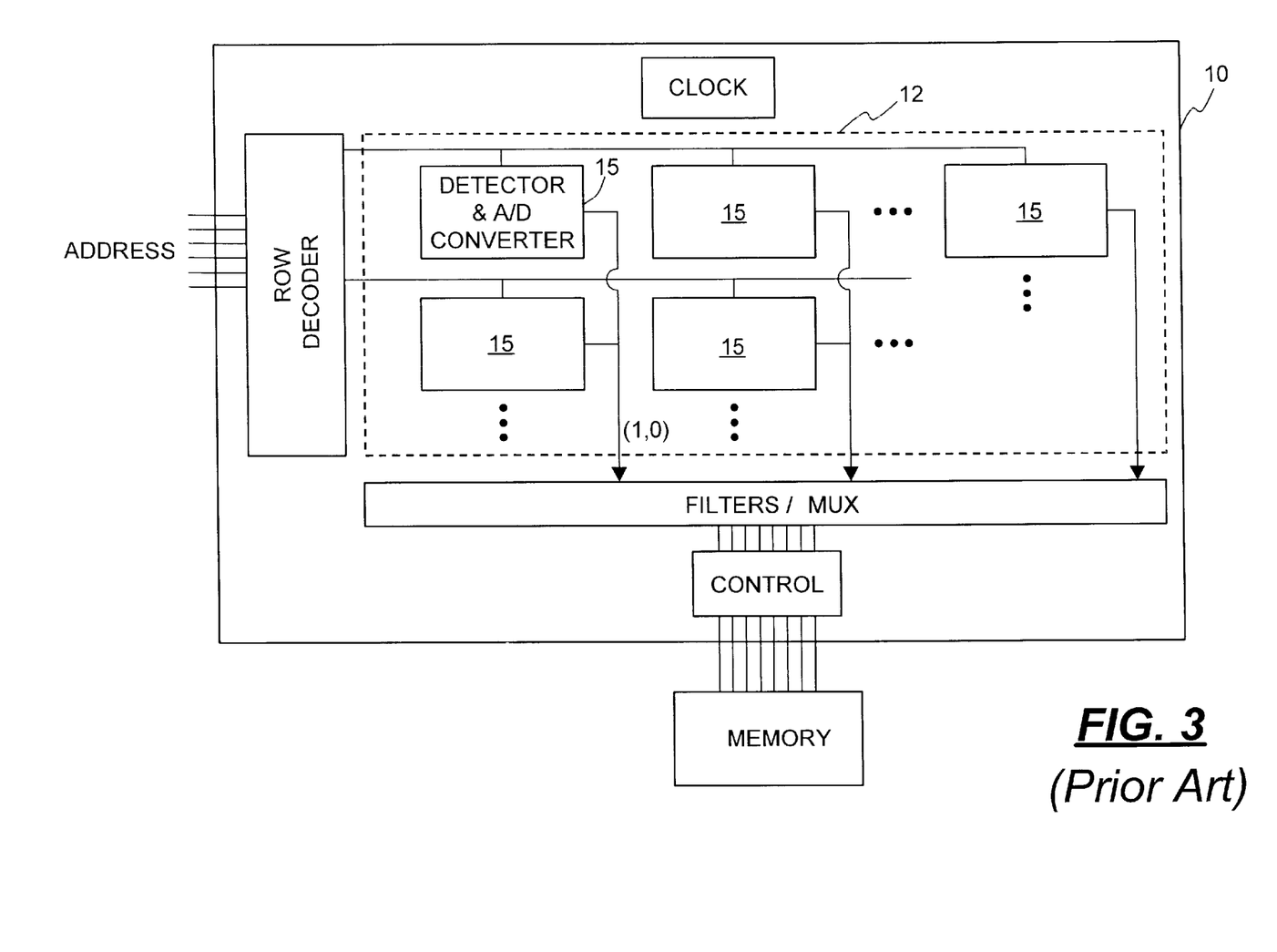
FIG. 3 illustrates the digital pixel sensor architecture used in the '425 patent which may be used to practice the method of the present invention.

In a preferred embodiment of the present invention, image sensor 106 is implemented as a digital pixel sensor (DPS). A CMOS image sensor with pixel level analog-to-digital conversion is described in U.S. Pat. No. 5,461,425 of B. Fowler et al. (the '425 patent), which reference is incorporated herein by reference in its entirety. FIG. 3 duplicates FIG. 1 of the '425 patent and illustrates the digital pixel sensor architecture used in the '425 patent which may be used to practice the method of the present invention. In FIG. 3, image sensor 10 is referred to herein as a digital pixel sensor (DPS) which provides a digital output signal at each pixel element representing the light intensity detected by that pixel element. The combination of a photodetector and an analog-to-digital (A/D) converter in an area image sensor helps enhance detection accuracy and reduce power consumption, and improves overall system performance.

In the present description, a digital pixel sensor (DPS) array or a sensor array refers to a digital image sensor having an array of photodetectors where each photodetector produces a digital output signal. The pixels of a DPS array are sometimes referred to as a "sensor pixel" or a "sensor element" or a "digital pixel," which terms are used to indicate that each of the photodetectors of a DPS array includes an analog-to-digital conversion (ADC) circuit, and is distinguishable from a conventional photodetector which includes a photodetector and produces an analog signal. The digital output signals of a DPS array have advantages over the conventional analog signals in that the digital signals can be read out at a much higher speed. Of course, other schemes for implementing a pixel level A/D conversion in an area image sensor may also be used in the image sensor of the present invention.

Figure 4:
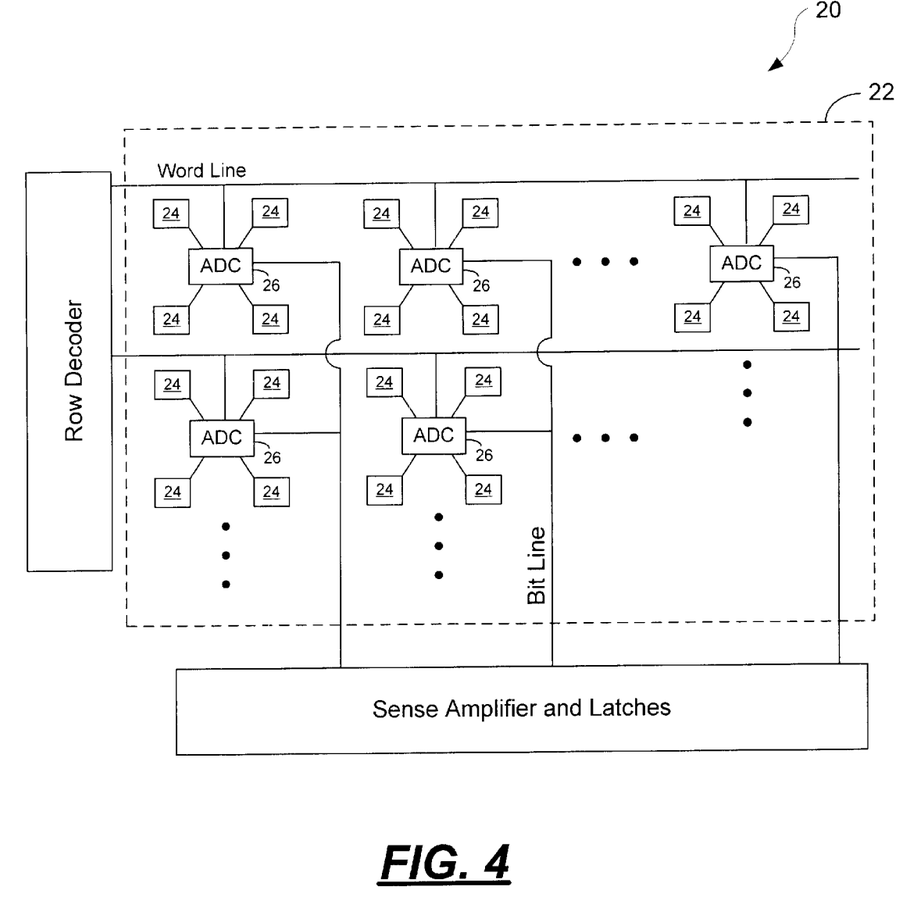
FIG. 4 is a block diagram of a digital image sensor where an A/D converter is associated with four photodetectors in an image sensor array.

In the digital pixel sensor architecture shown in FIG. 3, a dedicated ADC scheme is used. That is, each pixel element 15 in sensor array 12 includes an ADC circuit. The method of the present invention can also be practiced in other DPS architectures, including a shared ADC scheme. In the shared ADC scheme, instead of providing a dedicated ADC circuit to each photodetector in a sensor array, an ADC circuit is shared among a group of neighboring photodetectors. FIG. 4 is a block diagram of a digital image sensor where an A/D converter is associated with four photodetectors in an image sensor array. In digital image sensor 20 of FIG. 4, sensor array 22 includes a two-dimensional array of photodetectors 24. Instead of providing a dedicated ADC circuit to each photodetector, an ADC circuit 26 is shared among a group of four neighboring photodetectors 24. Each of the ADC circuits 26 performs A/D conversion of the output voltage signal from each photodetector by multiplexing between the four neighboring photodetectors. Although the image capture time becomes four times longer in the shared-ADC architecture of FIG. 4 than the dedicated-ADC architecture of FIG. 3, the shared-ADC architecture of FIG. 4 has the advantages of retaining the benefits of pixel level analog-to-digital conversion while using a much smaller circuit area, thus reducing manufacturing cost and improving yield. The shared-ADC architecture is also described in "A 640× 512 CMOS Image Sensor with Ultrawide Dynamic Range Floating-Point Pixel-Level ADC," by David X. D. Yang et al., IEEE Journal of Solid-State Circuits, Vol. 34, No. 12, December 1999, p. 1821–1834, which reference is incorporated by reference in its entirety.

In one embodiment of the present invention, the ADC circuit of each digital pixel or each group of digital pixels is implemented using the Multi-Channel Bit Serial (MCBS) analog-to-digital conversion technique described in U.S. Pat. No. 5,801,657 of Fowler et al. The MCBS ADC technique of the '657 patent can significantly improve the overall system performance while minimizing the size of the ADC circuit. Furthermore, as described in the '657 patent, an MCBS ADC has many advantages applicable to image acquisition and more importantly, facilitates high-speed readout. U.S. patent application Ser. No. 09/274,202 provides alternative ADC mechanisms that can significantly improve the overall system performance while minimizing the size of the A/D converters. Finally, copending and commonly assigned U.S. patent application Ser. No. 09/823,443 describes a multiplexed multi-channel bit serial ADC which may be advantageously applied to a DPS image sensor implementing a shared ADC architecture. The aforementioned patent and patent applications are incorporated herein by reference in their entireties.

Copending and commonly assigned U.S. patent application Ser. No. 09/567,638, entitled "Integrated Digital Pixel Sensor Having a Sensing Area and a Digital Memory Area" of David Yang et al., filed May 9, 2000, describes an integrated DPS sensor with an on-chip memory for storing at least one frame of pixel data. The incorporation of an on-chip memory in a DPS sensor alleviates the data transmission bottleneck problem associated with the use of an off-chip memory for storage of the pixel data. In particular, the integration of a memory with a DPS sensor makes feasible the use of multiple sampling for improving the quality of the captured images. Multiple sampling is a technique capable of achieving a wide dynamic range without many of the disadvantages associated with other dynamic range enhancement techniques, such as degradation in signal-to-noise ratio and increased implementation complexity. Copending and commonly assigned U.S. patent application Ser. No. 09/567,786, entitled "Multiple Sampling via a Time-indexed Method to Achieve Wide Dynamic Ranges," of David Xiao Dong Yang and Zhonghan Deng, filed May 9, 2000, (hereinafter "the '786 application") describes a method for facilitating image multiple sampling using a time-indexed approach. The aforementioned patent applications are incorporated herein by reference in their entirety.

Figure 5:
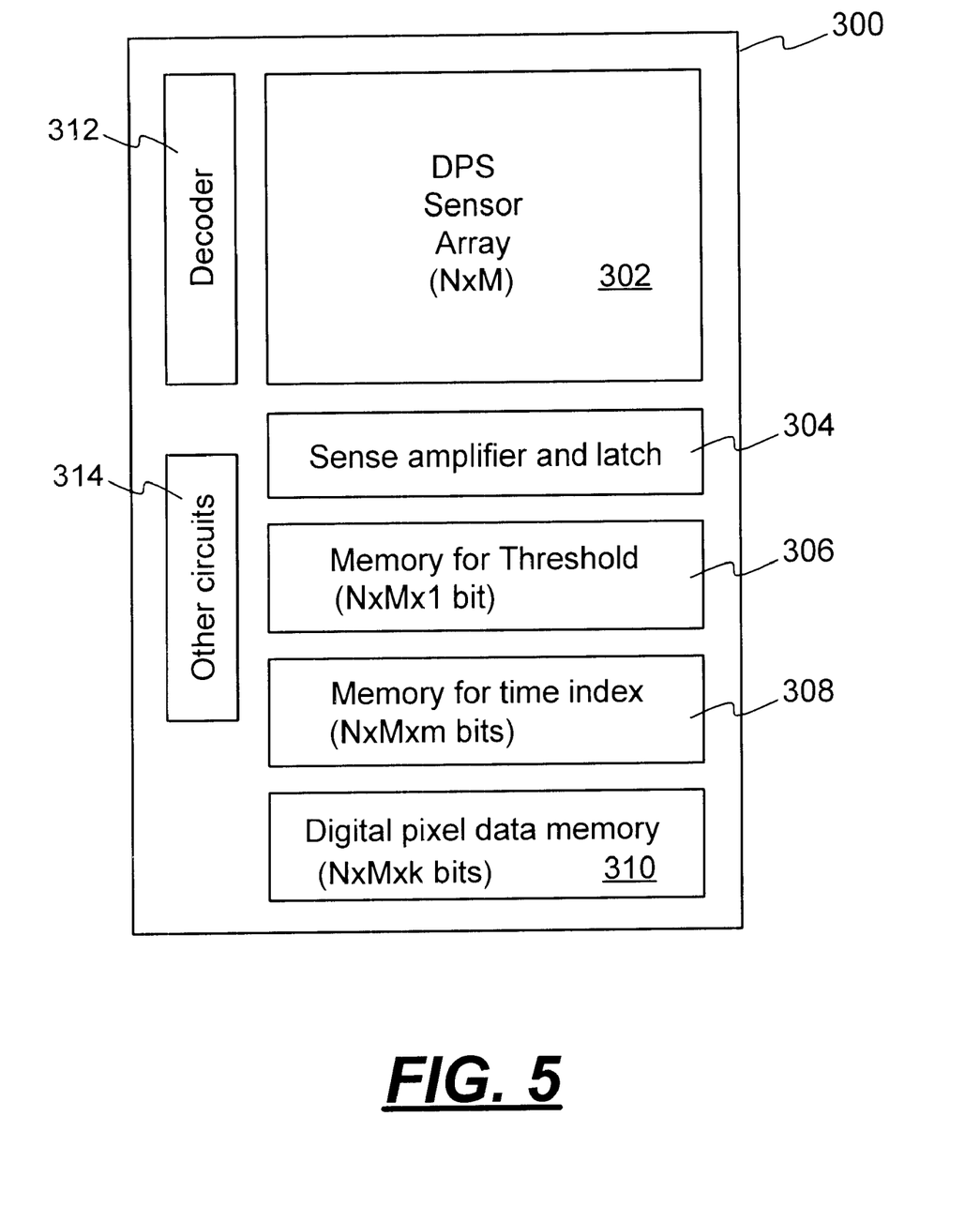
FIG. 5 shows a functional block diagram of an image sensor 300 which may be used to practice the method of the present invention.

FIG. 5 duplicates FIG. 3 of the '786 patent application and shows a functional block diagram of an image sensor 300 which may be used to practice the method of the present invention. The operation of image sensor 300 using multiple sampling is described in detail in the '786 patent application. Image sensor 300 includes a DPS sensor array 302 which has an N by M array of pixel elements. Sensor array 302 employs either the sensor architecture shown in FIG. 3 or FIG. 4 and incorporates pixel level analog-to-digital conversion. A sense amplifier and latch circuit 304 is coupled to sensor array 302 to facilitate the readout of digital signals from sensor array 302. The digital signals (also referred to as digital pixel data) are stored in digital pixel data memory 310. To support multiple sampling, image sensor 300 also includes a threshold memory 306 and a time index memory 308 coupled to sensor array 302. Threshold memory 306 stores information of each pixel indicating whether the light intensity value measured by each pixel in sensor array 302 has passed a predetermined threshold level. The exposure time indicating when the light intensity measured by each pixel has passed the threshold level is stored in time index memory 308. As a result of this memory configuration, each pixel element in sensor array 302 can be individually time-stamped by threshold memory 306 and time index memory 308 and stored in digital pixel data memory 310.

Returning to FIG. 2, image sensor 106 can be implemented as a DPS sensor using any one of the aforementioned architectures and ADC techniques. For example, image sensor 106 can be implemented using the dedicated ADC scheme or the shared ADC scheme. Depending on the DPS architecture used, SOC image sensor 102 includes the appropriate readout and control circuit 110 for facilitating the readout and processing of image data from image sensor 106. For instance, circuit 110 may include row and column decoders, sense amplifiers and other control circuitry. The image data from image sensor 106 is read by circuit 110 and stored in data memory 108. In the present embodiment, image sensor 106 utilizes the shared-ADC architecture of FIG. 4 and implements multiple sampling for improving the dynamic range of the photodetectors.

Data memory 108 is an integrated on-chip memory of SOC image sensor 102 and has the capacity for storing at least one frame of image data from image sensor 106. In one embodiment, data memory 108 may be configured as shown in FIG. 5 for supporting multiple sampling in image sensor 106. Thus, data memory 109 may include a digital data memory, a memory for time index values and a memory for threshold values.

The digital pixel data stored in data memory 108 can be processed by image processor 112 to provide the desired output image. Image processor 112 can be a conventional digital signal processing circuit. Image processor 112 operates on the digital pixel data stored in data memory 108 according to the applications and requirements of SOC image sensor 102. Thus, image processor 112 can perform signal processing functions such as demosaicing, tone correction, exposure control, and filtering.

SOC image sensor 102 includes processor 114 for controlling the operation of the different functional blocks of SOC image sensor 102. Processor 114 can be any microprocessor or controller (e.g., a commercially available or custom-made ASIC processor). Processor 114 controls and coordinates the integration process, the ADC process, the readout process, and the image processing process being run on SOC image sensor 102.

In accordance with the present invention, noise decoupling between noise-inducing circuits and noise-sensitive circuits in SOC image sensor 102 is accomplished by time multiplexing the "noisy" functions and the noise-sensitive functions. Specifically, the noisy functions and the noise-sensitive functions are time multiplexed so that they are processed at a separate time from each other. Thus, any noise generated by the noise-inducing circuits is isolated from the noise-sensitive circuits in the temporal sense. In one embodiment, the time multiplexing technique is implemented by deactivating the noise-inducing circuits whenever noise-sensitive circuits are activated. In one embodiment, the noise-inducing circuits are deactivated by turning off the system clock that is coupled to drive the noise-inducing circuits. Of course, in other embodiments, other methods for deactivating the noise-inducing circuits can be used, such as by asserting a circuit enable/disable signal associated with the particular circuit block.

In SOC image sensor 102, the noise-sensitive function is the analog-to-digital conversion (ADC) operations which are performed by ADC circuits within image sensor 106. Other circuits in SOC image sensor 102 are generally noise-inducing circuits. For example, the readout and control circuit 110 and image processor 112 are noise-inducing circuits. Any noise generated by readout and control circuit 110 and image processor 112 that is coupled to the By ADC circuits in image sensor 106 may reduce the signal-to-noise ratio of the ADC circuit and thus degrade the image quality. In order to ensure high image quality in SOC image sensor 102, it is important to decouple noise generated by the noisy readout and image processing circuits from the noise-sensitive ADC circuits.

Figure 6:
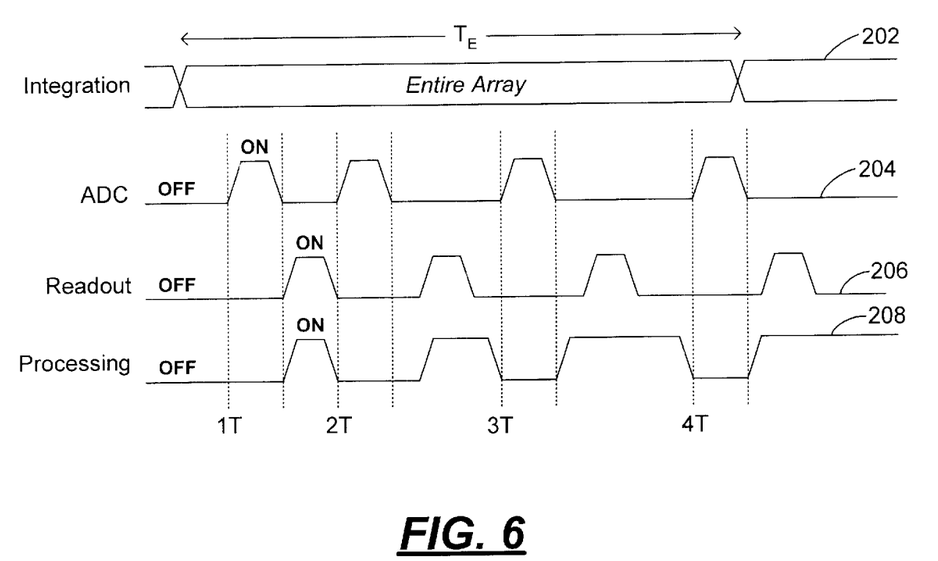
FIG. 6 is a timing diagram illustrating the operation of the noise decoupling method according to one embodiment of the present invention.

FIG. 6 is a timing diagram illustrating the operation of the noise decoupling method according to one embodiment of the present invention. The curves in FIG. 6 are used to illustrate the timing and the sequence of events occurring in SOC image sensor 102 while practicing the method of the present invention. In one embodiment, the curves in FIG. 6 can represent circuit enable signals to the respective circuit blocks. In other embodiments, the curves in FIG. 6 merely represent the operational state of SOC image sensor 102 and are not necessarily signals used in the operation of SOC image sensor 102.

Referring to FIG. 6, curve 202 represents the image integration operation where image sensor 106 is exposed to light for capturing the image of a scene. The time period $T_E$ denotes a snapshot of a scene in which an image of the scene is captured by SOC image sensor 102. In the present embodiment, multiple sampling is used and therefore, analog signals representing the integrated light intensity collected by the photodetectors in image sensor 106 are digitized and read out multiple times during the time period $T_E$. In the present illustration, multiple sampling is performed at times 1T, 2T, 3T and 4T. Note that these sampling times are exemplary only and other alternative sampling times can be used.

Curve 204 represents the ADC operation and curve 206 represents the Readout operation. In both cases, a high level denotes that the operation is activated and a low level denotes that the operation is deactivated. In the present embodiment, image sensor 106 is a DPS sensor. Therefore, the analog signal from each photodetector in image sensor 106 is first digitized and then readout by readout and control circuit 110 as digital pixel data. As shown in FIG. 6, an ADC operation is followed by a readout operation at each of exposure times 1T, 2T, 3T and 4T.

Curve 208 represents the image processing operation performed by image processor 112. Similar to curve 204 and 206, a high level denotes that the operation is activated and a low level denotes that the operation is deactivated. The image processing operation can include any one of demosaicing, tone correction, exposure control, and filtering.

In accordance with the method of the present invention, while the noise-sensitive ADC operation is taking place, SOC image sensor 102 deactivates all other noise-inducing operations. By deactivating the noise-inducing operations, SOC image sensor 102 can prevent noise from propagating to the ADC circuits and negatively impacting the accuracy of the ADC operations. Thus, referring to FIG. 6, whenever the ADC operation takes place, SOC image sensor 102 deactivates the readout and processing operations. In fact, readout and image processing operations are performed only when the ADC operation is not active. By time multiplexing the ADC function and the readout and processing functions, noise generated by the readout and processing circuits is decoupled from the ADC circuit.

In one embodiment of the present invention, processor 114 handles the task of time multiplexing the noise-inducing functions and the noise-sensitive functions. As mentioned above, in one embodiment, processor 114 performs time multiplexing by activating or deactivating the system clock coupled to the functional blocks of SOC image sensor 102 for driving the operation of the functional blocks. For example, to disable the image processing operation when an ADO operation is to be started, processor 114 of SOC image sensor 102 issues a command stopping the toggling of the system clock which is used to drive image processor 112. Without the system clock, the operation of image processor 112 ceases and image processor 112 awaits the next clock pulse to resume operation. Of course, in other embodiments, other methods for activating and deactivating the ADC, readout and processing operations can be used, including the use of a circuit enable signal for each circuit block.

The method of the present invention has particular application in a DPS sensor employing pixel level analog-to-digital conversion. In a DPS image sensor, analog-to-digital conversion is performed in a massively parallel fashion. Thus, the ADC operation in a DPS image sensor can occur very quickly and for only a short amount of time relative to the overall image sensor operation. The method of the present invention takes advantages of the brevity of the ADC operation and time multiplexes the ADC and other operations so as to decouple noise. Because the ADC operation is short, the SOC image sensor can shut down other operations while ADC is being carried out. Therefore, the time multiplexing technique of the present invention can be used to decouple noise while not causing appreciable speed degradation in the overall operation of the SOC image sensor.

In the above description, the ADC circuits in image sensor 106 is assumed to be the only noise-sensitive circuit in SOC image sensor 102. Of course, in other embodiments, SOC image sensor 102 may include other noise-sensitive circuits besides the ADC circuits. The method of the present invention can be applied to time multiplex any noise-sensitive circuits with any noise-inducing circuits, as long as the circuit operation does not require simultaneous operation of the different circuits.

The above detailed descriptions are provided to illustrate specific embodiments of the present invention and are not intended to be limiting. Numerous modifications and variations within the scope of the present invention are possible. For example, the method of the present invention can be applied to other mixed mode integrated circuits for noise decoupling as long as the various operations can be time multiplexed. The method of the present invention also has application in a system on a chip for various other applications, including a video camera. The present invention is defined by the appended claims.

I claim:

1. A system on a chip for an image sensor, comprising:
   a sensor array, including a two-dimensional array of pixel elements, that outputs digital signals as pixel data representing an image of a scene, said sensor array comprising a plurality of analog-to-digital conversion (ADC) circuits, each ADC circuit being coupled to one or more pixel elements in said sensor array;
   a readout circuit in communication with said sensor array for reading said pixel data from said sensor array;
   a data memory, in communication with said sensor array, for storing said pixel data; and
   a processor, in communication with said data memory, for processing said pixel data;
   wherein said system on a chip deactivates at least one noise-inducing circuit while a noise-sensitive circuit is activated.

2. The system on a chip of claim 1, wherein said noise-sensitive circuit is one or more of said ADC circuits, and said noise-inducing circuit is one of said readout circuit, said data memory and said processor.

3. The system on a chip of claim 1, wherein operations of said noise-sensitive circuit and operations of said at least one noise-inducing circuit are time multiplexed.

4. The system on a chip of claim 1, wherein said processor is coupled to control operations of said sensor array, said readout circuit, and said data memory.

5. The system on a chip of claim 4, wherein said ADC circuits in said sensor array, said readout circuit, said data memory and said processor are operated based on a system clock, and said processor deactivates said at least one noise-inducing circuit by disabling said system clock coupled to said noise-inducing circuit.

6. A system on a chip for an image sensor, comprising:
   a sensor array, including a two-dimensional array of pixel elements, that outputs digital signals as pixel data representing an image of a scene, said sensor array comprising a plurality of analog-to-digital conversion (ADC) circuits, each ADC circuit being coupled to one or more pixel elements in said sensor array;
   a readout circuit in communication with said sensor array for reading said pixel data from said sensor array;
   a data memory, in communication with said sensor array, for storing said pixel data; and
   a processor, in communication with said data memory, for processing said pixel data;
   wherein when said ADC circuits are activated, at least one of said readout circuit and said processor is deactivated.

7. The system on a chip of claim 6, wherein operations of said ADC circuits and operations of at least one of said readout circuit and said processor are time multiplexed.

8. The system on a chip of claim 7, wherein said sensor array generates multiple representations of said image at a plurality of exposure times, said plurality of exposure times being within a snapshot of said image.

9. The system on a chip of claim 7, wherein said processor is coupled to control operations of said sensor array, said readout circuit, and said data memory.

10. The system on a chip of claim 9, wherein said ADC a circuits in said sensor array, said readout circuit, said data memory and said processor are operated based on a system clock, and said processor deactivates said readout circuit and said processor by disabling said system clock coupled to said readout circuit and said processor.

11. The system on a chip of claim 7, wherein said processor is activated whenever said ADC circuits are deactivated.

12. A method in a system on a chip for an image sensor, comprising:
   providing a sensor array, including a two-dimensional array of pixel elements, that outputs digital signals as pixel data representing an image of a scene, said sensor array comprising a plurality of analog-to-digital conversion (ADC) circuits, each ADC circuit being coupled to one or more pixel elements in said sensor array;
   providing a readout circuit in communication with said sensor array for reading said pixel data from said sensor array;
   providing a data memory, in communication with said sensor array, for storing said pixel data;
   providing a processor, in communication with said data memory, for processing said pixel data;
   activating at least one of said ADC circuits for generating said digital data at least one of said pixel elements; and
   while said at least one of said ADC circuits is activated, deactivating said readout circuit, said data memory and said processor.

13. The method of claim 12, wherein said activating and said deactivating comprise enabling and disabling, respectively, a system clock coupled to said ADC circuits, said readout circuit, said data memory and said processor.

14. The method of claim 12, wherein said sensor array generates multiple representations of said image at a plurality of exposure times, said plurality of exposure times being within a snapshot of said image.

15. A method in a system on a chip for an image sensor, comprising:
   providing a sensor array, including a two-dimensional array of pixel elements, that outputs digital signals as pixel data representing an image of a scene, said sensor array comprising a plurality of analog-to-digital conversion (ADC) circuits, each ADC circuit being coupled to one or more pixel elements in said sensor array;
   providing a readout circuit in communication with said sensor array for reading said pixel data from said sensor array;
   providing a data memory, in communication with said sensor array, for storing said pixel data;
   providing a processor, in communication with said data memory, for processing said pixel data;
   activating at least one noise-sensitive circuit; and while said at least one noise-sensitive circuit is activated, deactivating at least one noise-inducing circuit.

16. The method of claim 15, wherein said activating and said deactivating comprise enabling and disabling, respectively, a system clock coupled to said noise-sensitive circuit and said noise-inducing circuit.

17. The method of claim 15, wherein said noise-sensitive circuit is one or more of said ADC circuits, and said noise-inducing circuit is one of said readout circuit, said data memory and said processor.

* * * * *

UNITED STATES PATENT AND TRADEMARK OFFICE
CERTIFICATE OF CORRECTION

PATENT NO. : 6,541,751 B1
APPLICATION NO. : 09/970463
DATED : April 1, 2003
INVENTOR(S) : William R. Bidermann It is certified that error appears in the above-identified patent and that said Letters Patent is hereby corrected as shown below:

Title Page: Item [73] Please add --Assignee: PIXIM, Incorporated, Mountain View, CA (US)--.

Signed and Sealed this

Twenty-ninth Day of January, 2008

JON W. DUDAS
*Director of the United States Patent and Trademark Office*